(12) United States Patent
Parker

(10) Patent No.: US 10,392,189 B2
(45) Date of Patent: Aug. 27, 2019

(54) REFUSE VEHICLE WITH A SLANT FLOOR REFUSE CONTAINER

(71) Applicant: The Heil Co., Chattanooga, TN (US)

(72) Inventor: Brian T. Parker, Signal Mountain, TN (US)

(73) Assignee: The Heil Co., Chattanooga, TN (US)

( * ) Notice: Subject to any disclaimer, the term of this patent is extended or adjusted under 35 U.S.C. 154(b) by 69 days.

(21) Appl. No.: 14/881,432

(22) Filed: Oct. 13, 2015

(65) Prior Publication Data

US 2016/0101935 A1 Apr. 14, 2016

Related U.S. Application Data

(60) Provisional application No. 62/063,201, filed on Oct. 13, 2014.

(51) Int. Cl.
*B65F 3/00* (2006.01)
*B60P 1/28* (2006.01)

(52) U.S. Cl.
CPC .............. *B65F 3/00* (2013.01); *B60P 1/283* (2013.01); *B65F 2003/006* (2013.01); *B65F 2210/132* (2013.01)

(58) Field of Classification Search
CPC .......... B65F 2003/006; B65F 2003/025; B65F 2210/132; B65F 3/00; B65F 3/26; B60P 1/283; B60P 1/162; B60P 1/16; B60P 1/04; B60P 9/00
See application file for complete search history.

(56) References Cited

U.S. PATENT DOCUMENTS

| | | | | |
|---|---|---|---|---|
| 1,331,239 A | * | 2/1920 | Cartwright | E03F 7/10 210/241 |
| 1,891,885 A | * | 12/1932 | Tapp | B65F 3/00 296/26.01 |
| 3,039,823 A | * | 6/1962 | Eaton | B60P 1/162 298/22 R |
| 3,263,846 A | | 8/1966 | Balbi | |
| 3,411,645 A | | 11/1968 | Herpich et al. | |
| 3,610,690 A | * | 10/1971 | Mengel | B60P 1/16 298/17.5 |
| 3,734,318 A | * | 5/1973 | Kraus | B65F 3/00 198/511 |
| 4,067,470 A | * | 1/1978 | Felburn | B65F 3/14 414/469 |
| 4,273,497 A | | 6/1981 | Mealing et al. | |
| 4,648,775 A | | 3/1987 | Verner | |
| 4,691,959 A | | 9/1987 | Verner | |
| 4,786,003 A | * | 11/1988 | Johnson | B65F 3/00 241/101.741 |
| 4,909,564 A | | 3/1990 | Pfeifer et al. | |

(Continued)

FOREIGN PATENT DOCUMENTS

CN 102658940 A * 9/2012 ............... B65F 3/26

*Primary Examiner* — Glenn F Myers
(74) *Attorney, Agent, or Firm* — Fish & Richardson P.C.

(57) ABSTRACT

A refuse vehicle has a chassis, supported by wheels, a cab and a drive train. The drive train drives at least one of the wheels. A refuse container is supported by the chassis. A mount on the chassis couples with the refuse container. The mount is positioned on the chassis so that a floor of the refuse container is angled, with respect to horizontal in a resting position, so that liquid in the refuse container runs to one end of the refuse container.

17 Claims, 3 Drawing Sheets

(56) References Cited

U.S. PATENT DOCUMENTS

| | | | |
|---|---|---|---|
| 5,199,826 A * | 4/1993 | Lawrence | B60P 1/60 |
| | | | 406/137 |
| 5,271,657 A | 12/1993 | Lockett | |
| 5,931,628 A | 3/1999 | Christenson | |
| 6,149,371 A | 11/2000 | DeVries et al. | |
| 6,817,677 B1 | 11/2004 | Beiler | |
| 8,670,906 B2 * | 3/2014 | Ichinose | B60P 1/045 |
| | | | 701/49 |
| 8,821,725 B2 * | 9/2014 | Weston | B03B 9/063 |
| | | | 137/574 |
| 9,120,416 B2 * | 9/2015 | Minoshima | B60P 1/283 |
| 9,174,562 B2 * | 11/2015 | Uozu | B60P 1/162 |
| 2002/0109393 A1 * | 8/2002 | Brooks, Jr. | B60P 1/283 |
| | | | 298/7 |
| 2002/0180240 A1 * | 12/2002 | Fujan | B60P 3/40 |
| | | | 296/182.1 |
| 2004/0179928 A1 * | 9/2004 | Bartlett | B65F 3/28 |
| | | | 414/525.6 |
| 2015/0059598 A1 | 3/2015 | Philipp et al. | |

\* cited by examiner

REFUSE VEHICLE WITH A SLANT FLOOR REFUSE CONTAINER

CROSS-REFERENCE TO RELATED APPLICATIONS

This application claims the benefit of U.S. Provisional Application No. 62/063,201, filed on Oct. 13, 2014. The entire disclosure of the above application is incorporated herein by reference.

FIELD

The present disclosure relates to refuse vehicles and, more particularly, to a refuse vehicle with a container floor sloped below horizontal to capture liquids.

BACKGROUND

In refuse collection, various types of collection vehicles are utilized. One type of container utilized on a vehicle includes rear loading with a ram to compress the refuse within the container. In turn, these containers are emptied with the ram pushing the refuse out of the container. When the refuse is picked up, various types of liquids are contained within the refuse. The liquid ordinarily is intermixed with the refuse. Ultimately the liquid seeps to the floor of the container. However, the liquid may exit the container due to stopping or starting of the vehicle. Thus, it would be desirous to contain the liquid in the refuse container until the container is dumped at a refuse facility.

The present disclosure provides the art with such a refuse vehicle and refuse container. The present device enables the container floor to slant or slope below horizontal to capture liquid at one end of the container. The liquid can be expelled from the container by a pump. Alternatively, the liquid can be expelled during emptying of the container by raising the container so that the slope of the container floor is at or slightly above horizontal.

SUMMARY

It is an object of the disclosure to provide a refuse vehicle that comprises a vehicle chassis supported by wheels. The chassis includes a cab with a drive train supported by the chassis. The drive train drives at least one of the wheels. A refuse container is supported by the vehicle chassis. A mount is on the chassis to couple with the refuse container. The mount, such as a pivot, is positioned on the chassis so that the refuse container floor can slant or slope with respect to horizontal on the chassis in a resting position. The slope is such that the liquid in the refuse container moves toward one end, the forward end of the refuse container. A pump may be contained within the container to remove the liquid from the refuse container. A lift mechanism, such as a hydraulic cylinder, may be coupled with the chassis and the refuse container to raise the container to a level a few degrees, such as 1°-5°, above horizontal so that the liquid may exit the refuse container upon dumping of the refuse container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
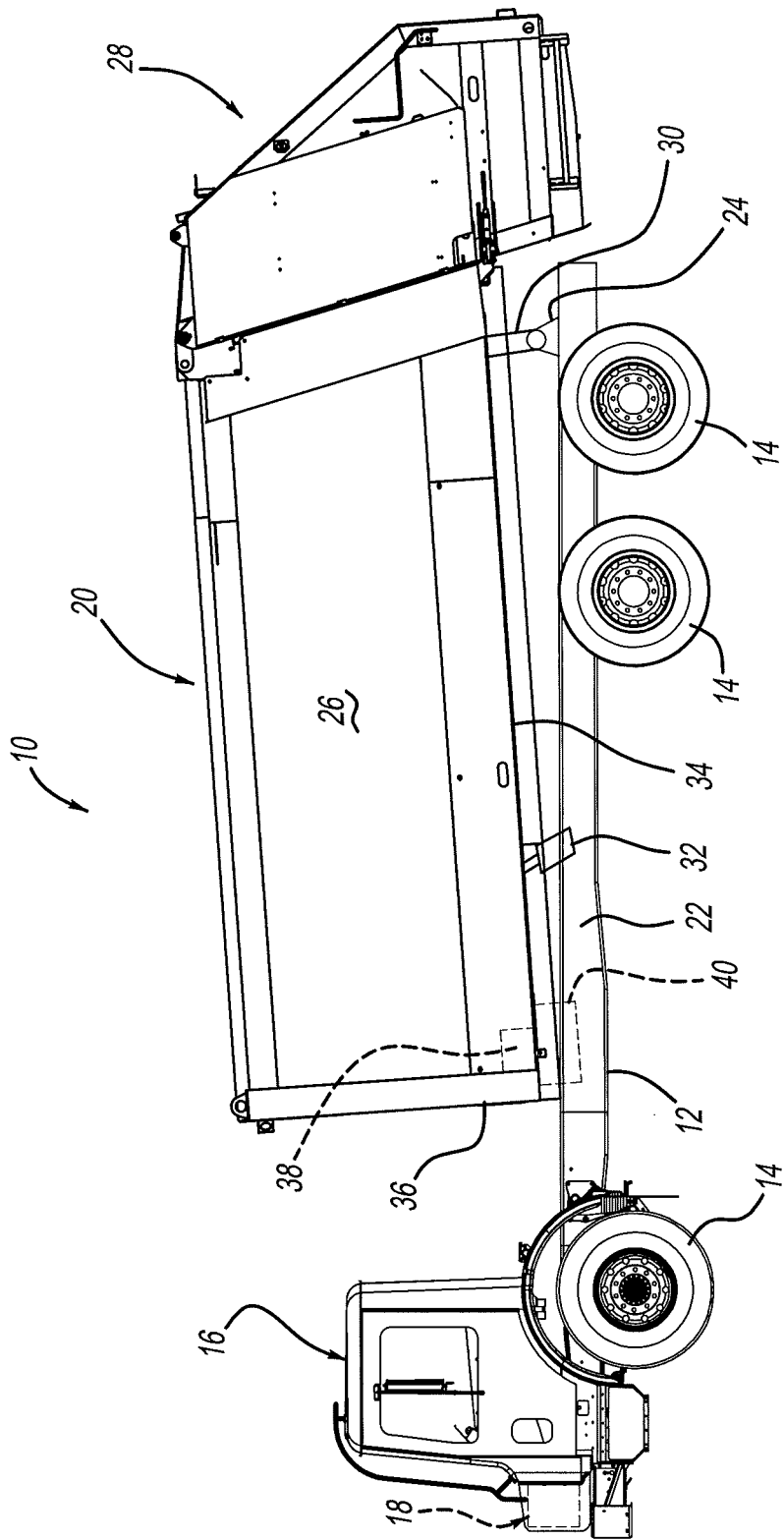
FIG. 1 is a side elevation view of a refuse vehicle in accordance with the present disclosure.

FIG. 1 illustrates a refuse vehicle and is designated with the reference numeral 10. The vehicle 10 includes a chassis 12 supported by wheels 14. A cab 16 is supported on the chassis 12. A drive train including an engine 18, transmission, drive shafts and the like drive at least one wheel in a conventional manner.

A container 20 is coupled with the chassis 12. The chassis 12 includes a frame member 22 that includes a mount 24. The mount 24 is a pivot mount. The mount 24 is located above the chassis 12 at the rear of the chassis 12. The container 20 includes a body 26 with a rear collection mechanism 28. The refuse is loaded into the rear collection mechanism 28 and is passed into the body 26 and compressed in a conventional manner. During compression, the refuse will include liquid which is retained in the container. The liquid will seep to the floor 34 of the container 20.

The container 20 includes a mount 30 that couples with the pivot mount 24. The mount 30 enables the container to pivot about the pivot mount 24 at the rear portion of the chassis frame 22. Additionally, the chassis 12 includes a lifting mechanism 32 coupled with the chassis 22 and the body 26. The lift mechanism 32 may be a hydraulic cylinder or the like. The lifting mechanism 32 is positioned toward the front of the body 26 away from the collection mechanism. Thus, as the lifting mechanism 32 is actuated, the body 26 pivots around the mounts 24 and 30.

Figure 2:
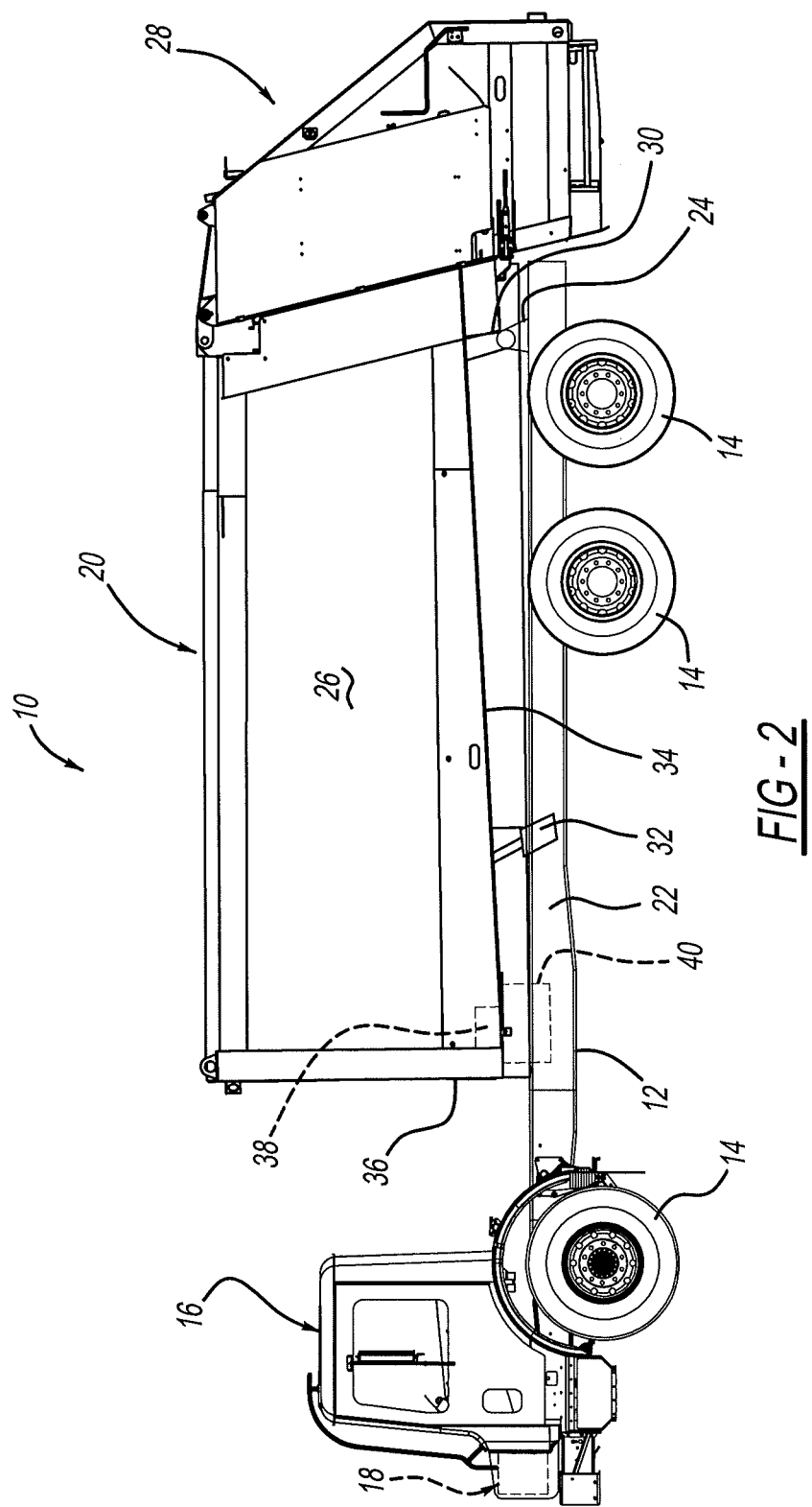
FIG. 2 is a side elevation view like FIG. 1 with a parallel container on a sloped floor.
Figure 3:
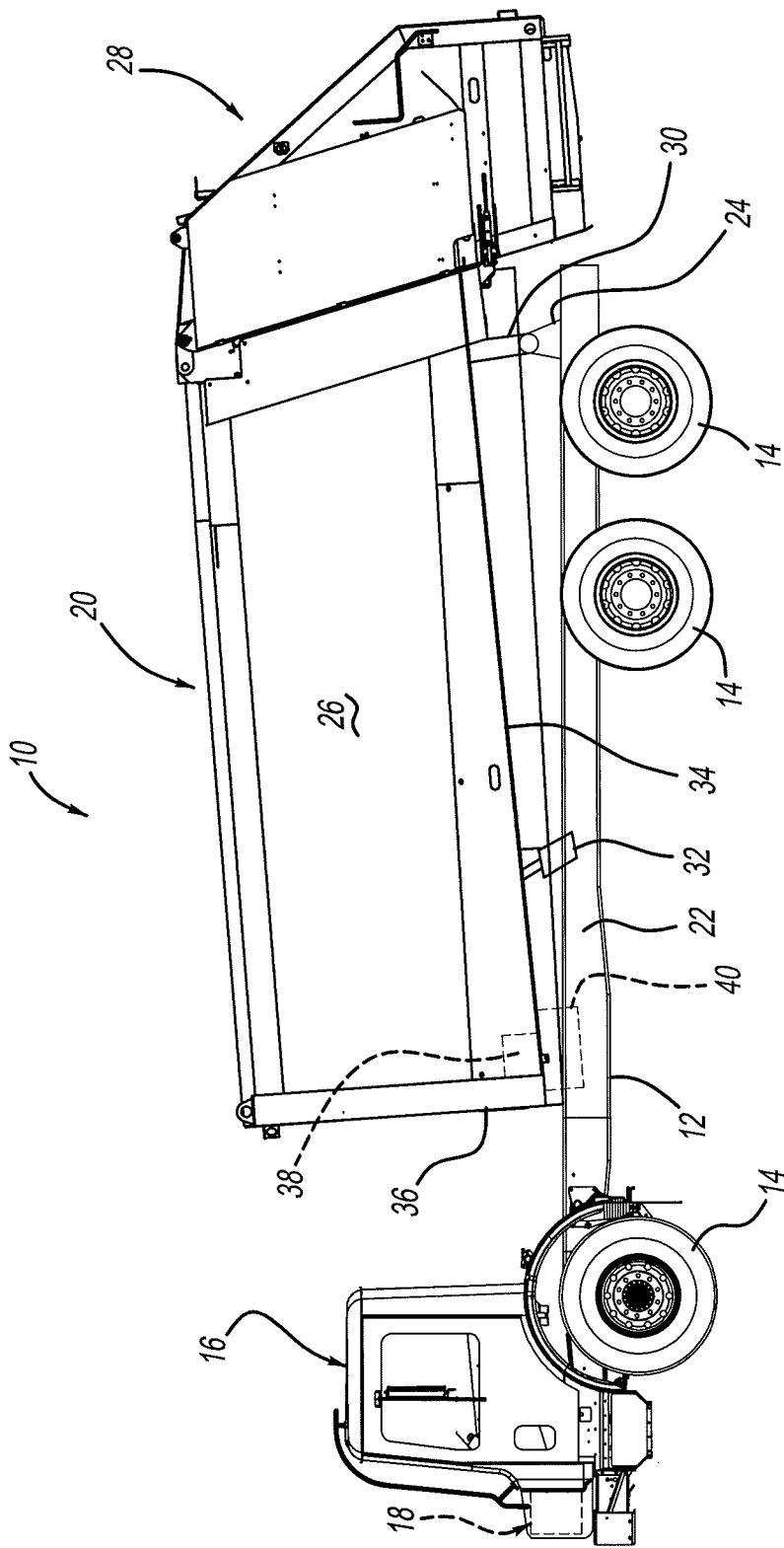
FIG. 3 is a side elevation view like FIG. 1 with the container including a sloped floor.

The body 26, in a resting position, is such that the body floor 34 is on a continuous slope, slant or angle. The floor 34 is sloped or angled towards the front or first end 36 of the body 26. The slope is 10°-15° below horizontal. Thus, the slope can be created by the position of the container 20 on the chassis 12, the floor itself or both. Accordingly, the container 20 can be positioned on the chassis 12 and the mount 24 such that the container 20 and floor 34 are on a continuous slope toward the front end 36 (FIG. 1). Additionally, the container 20 can be positioned on the chassis 12 and mount 24 such that the container 20 is horizontal. Here, the floor 34, in the container 20, would be continuously sloped toward the front 36 (FIG. 2). Also, a container 20 with a sloped floor 34 could be positioned on the chassis 12 so that the container 20 is sloped (FIG. 3). Thus, liquid in the refuse container 20 is retained in the refuse container 20 at the front or first end 36 of the container 20. Accordingly, during stops and starts of the vehicle 10, the liquid is maintained in the refuse container 20.

The refuse container 20 may include a pump 38 or the like to eject liquid from the refuse container 20. Additionally, a trap, tank 40 or the like may be utilized to retain the liquid in the body 26 until the load is ejected. At the time of ejection, the lift mechanism 32 is activated to move the refuse container floor 34 to horizontal or a few degrees above horizontal, such as 1°-5°, so that the liquid within the refuse container 20 may be ejected with the refuse load. Accordingly, the refuse container 20 retains the liquid in the refuse container 20 until the liquid is ready to be ejected from the refuse container 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refuse vehicle comprising:
a vehicle chassis supportable on a ground surface by wheels, a cab and drive train supported by the chassis, the drive train driving at least one of the wheels;
a refuse container having a first end and a second end and defining an axis horizontal to the ground surface extending between the first end and the second end of the refuse container, the first end is positioned proximate the vehicle cab, the refuse container is supported by the vehicle chassis;
a collection mechanism coupled to the refuse container, the collection mechanism configured to load refuse intermixed with liquid into the refuse container;
a first mount on the chassis coupled to a second mount on the refuse container, the first mount is positioned above the chassis so that the refuse container is angled toward the ground surface with respect to the horizontal axis in a resting position, the refuse container comprising a floor that is continuous from the first end to the second end, such that the liquid intermixed with the refuse loaded into the refuse container by the collection mechanism moves along the refuse container floor in a direction from the second end of the refuse container toward the first end of the refuse container,
a tank residing proximate the first end of the refuse container, the tank configured to collect and retain at least a portion of the liquid; and
a pump positioned proximate the first end of the refuse container, the pump configured to eject liquid from the tank.

2. The refuse vehicle of claim 1, wherein a lift mechanism is coupled with the chassis and the refuse container, the lift mechanism configured to raise the refuse container to a position where the refuse container floor is at least horizontal relative to the ground surface, such that the liquid in the refuse container escapes from the refuse container during unloading or dumping of the refuse container.

3. The refuse vehicle of claim 2, wherein the lift mechanism comprises a hydraulic cylinder.

4. The refuse vehicle of claim 2 wherein the lift mechanism is configured to raise the refuse container to a position where the refuse container floor is angled 1°-5° above the horizontal axis.

5. The refuse vehicle of claim 1, wherein the first mount comprises a pivot mount.

6. The refuse vehicle of claim 1 wherein the refuse container floor comprises a sloped floor.

7. The refuse vehicle of claim 1 wherein, when the refuse container is in the resting position, the refuse container floor has an overall slope of 10-15° relative to horizontal axis.

8. The refuse vehicle of claim 1 wherein the collection mechanism is configured to load the refuse into the refuse container from the second end of the refuse container.

9. A refuse vehicle comprising:
a vehicle chassis supportable on a ground surface by wheels, a cab and drive train supported by the chassis, the drive train driving at least one of the wheels;
a refuse container having a first end and a second end and defining an axis horizontal to the ground surface extending between the first end and the second end of the refuse container, the first end is positioned proximate the vehicle cab, the refuse container is supported by the vehicle chassis;
a collection mechanism coupled to the refuse container, the collection mechanism configured to load refuse intermixed with liquid into the refuse container;
a mount on the chassis coupled to the refuse container, the mount is positioned on the chassis so that the refuse container is angled toward the ground surface with respect to the horizontal axis in a resting position, the refuse container comprising a floor that is continuous from the first end to the second end, such that the liquid intermixed with the refuse loaded into the refuse container by the collection mechanism moves along the refuse container floor in a direction from the second end of the refuse container toward the first end of the refuse container;
a tank residing proximate the first end of the refuse container, the tank configured to collect and retain at least a portion of the liquid; and
a pump positioned proximate the first end of the refuse container, the pump configured to eject liquid from the tank.

10. The refuse vehicle of claim 9 wherein the refuse container floor comprises a sloped floor.

11. The refuse vehicle of claim 9 wherein, when the refuse container is in the resting position, the refuse container floor has an overall slope of 10-15° relative to horizontal axis.

12. The refuse vehicle of claim 9 wherein the collection mechanism is configured to load the refuse into the refuse container from the second end of the refuse container.

13. A refuse vehicle comprising:
a vehicle chassis supportable on a ground surface by wheels, a cab and drive train supported by the chassis, the drive train driving at least one of the wheels;
a refuse container having a first end and a second end and defining an axis horizontal to the ground surface extending between the first end and the second end of the refuse container, the first end is positioned proximate the vehicle cab, the refuse container is supported by the vehicle chassis;
a collection mechanism coupled to the refuse container, the collection mechanism configured to load refuse intermixed with liquid into the refuse container;
a mount on the chassis coupled to the refuse container, the mount is positioned on the chassis so that the refuse container is angled toward the ground surface by an overall slope of 10°-15° with respect to the horizontal axis in a resting position, the refuse container comprising a floor that is continuous from the first end to the second end;
a lift mechanism coupled with the chassis and the refuse container, the lift mechanism configured to raise the refuse container to a lift position where the refuse container floor is angled 1°-5° above the horizontal axis;

a tank residing proximate the first end of the refuse container, the tank configured to collect and retain at least a portion of the liquid; and a pump positioned proximate the first end of the refuse container, the pump configured to eject liquid from the tank.

14. The refuse vehicle of claim 13 wherein the refuse container floor comprises a sloped floor.

15. The refuse vehicle of claim 13 wherein the lift mechanism is coupled proximate the first end of the container.

16. The refuse vehicle of claim 15 wherein the mount comprises a pivot mount, and wherein actuation of the lift mechanism causes the container to pivot around the pivot mount.

17. The refuse vehicle of claim 13 wherein the collection mechanism is configured to load the refuse into the refuse container from the second end of the refuse container.

\* \* \* \* \*